Patented Mar. 20, 1951

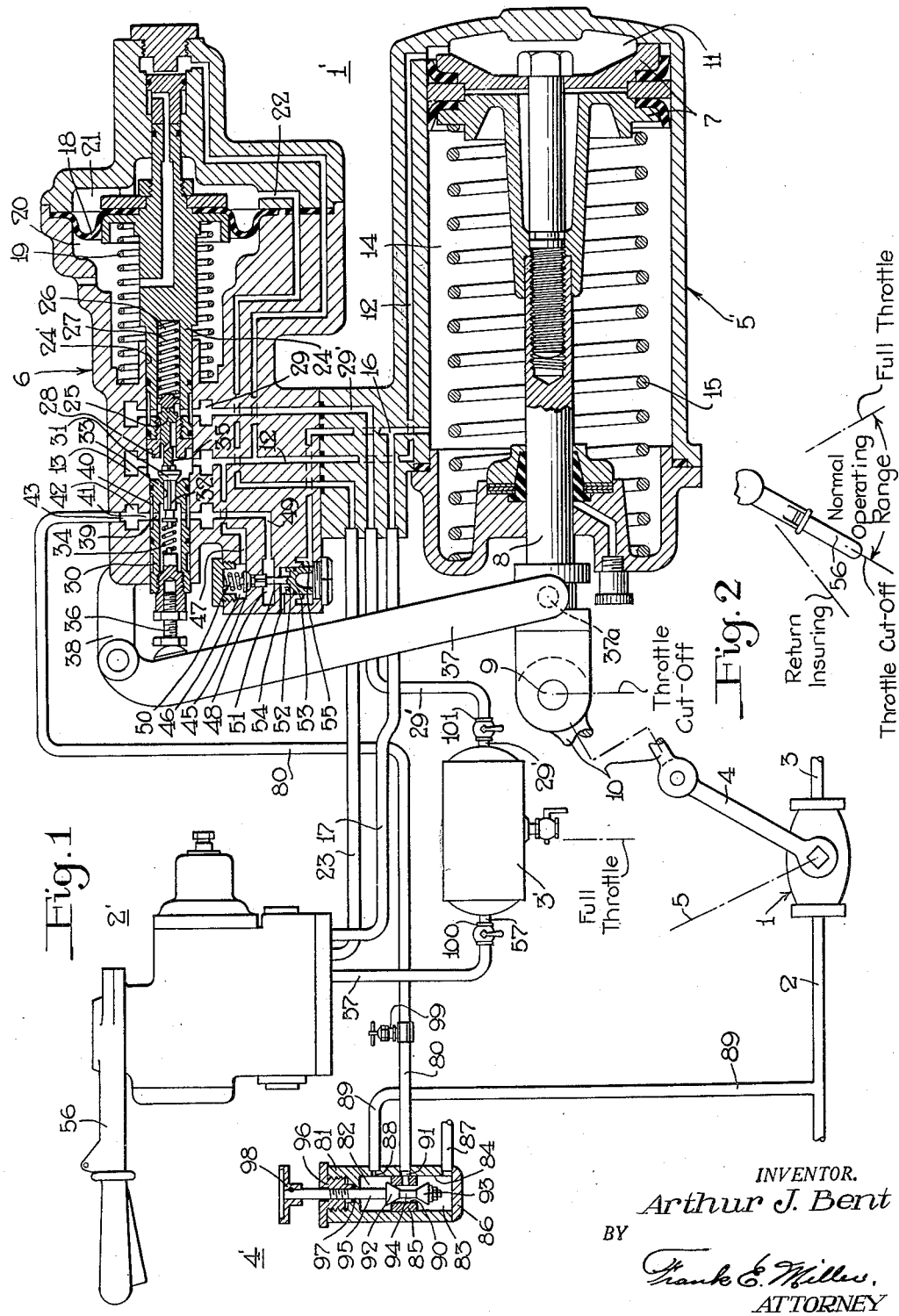

2,545,509

UNITED STATES PATENT OFFICE 2,545,509

FLUID PRESSURE THROTTLE CONTROL APPARATUS

Arthur J. Bent, Pittsburgh, Pa., assignor to The Westinghouse Air Brake Company, Wilmerding, Pa., a corporation of Pennsylvania Application September 19, 1947, Serial No. 774,969

6 Claims. (Cl. 121—38)

This invention relates to fluid pressure control apparatus and more particularly to fluid pressure apparatus for controlling the positioning of a device, such as a steam locomotive throttle.

One object of the invention is the provision of an improved apparatus of the above type.

Another object of the invention is the provision of an improved control apparatus embodying an operator's fluid pressure control device and a fluid pressure servo-motor controlled thereby for positioning a device such as a throttle for a steam locomotive.

Another object of the invention is the provision of an apparatus such as defined above embodying means operative, in case of failure of the normal supply of fluid under pressure, to control the servo-motor by other fluid pressure such as steam.

According to the above objects, the improved control apparatus is particularly adapted for, though not limited to, use in a system employing a first fluid, such as air, as a normal control medium, and a second fluid, such as steam, as a working medium. Such is the case on a steam locomotive, and it will be assumed as an example that the fluid pressure control apparatus herein described and embodying the invention is normally air operated for controlling a steam throttle device on a steam locomotive or the like.

Other objects and advantages will be apparent from the following more detailed description of the invention.

In the accompanying drawing; Fig. 1 is a diagrammatic view, partly in outline and partly in section, of a control apparatus embodying the invention; and Fig. 2 is a partial plan view of an operator's control device which, in Fig. 1, is shown in vertical outline.

Description

In the drawings, the reference numeral 1 designates an adjustable engine throttle valve device for controlling flow of power fluid, such as steam, from a pipe 2 to a pipe 3. The pipe 2 may be supplied with steam from a locomotive boiler (not shown) while the pipe 3 may be arranged to convey steam supplied thereto to the locomotive driving means (not shown) for propelling the locomotive. The throttle valve device is operable to regulate or vary the amount of steam supplied to the pipe 3 by adjustment of a lever 4 to and between a throttle cut-off or power off position, in which it is shown in the drawing, and a full throttle or maximum power position such as indicated by a dot-dash line 5.

As shown in the drawing reference numeral 1' designates a fluid pressure motor for adjusting the position of the throttle control lever 4; and the reference numeral 2' designates an operator's control valve device (shown partly in section and partly in outline) for controlling normal operation of the fluid pressure motor 1; reference numeral 3' designates a fluid pressure reservoir for storing a fluid, such as air, under pressure for use in normal operation of the control apparatus; and reference numeral 4' designates an emergency valve device for controlling emergency operation of the motor 1.

The fluid pressure motor 1' is substantially the same as that disclosed and described in the co-pending application of Harry C. May, Serial No. 550,691, filed August 23, 1944, now Patent No. 2,501,729, issued March 28, 1950, and assigned to the assignee of the present invention, in view of which it will be described in the present application only in such detail as required for a comprehensive understanding of the invention.

The motor 1' comprises a casing containing a power portion 5' and a pilot portion 6. The power portion 5' comprises a double acting power piston 7 having a rod 8 attached thereto and extending through a suitable packing gland to the outside of the casing. The outer end of the rod 8 is pivotally connected by a pin 9 to one end of a link 10 the opposite end of which is pivotally connected to the end of the throttle control lever 4.

At one side of the power piston 7 there is provided a control chamber 11 which is connected by way of a control passage 12 to a chamber 13 in pilot portion 6, through which passage and chamber 13 fluid under pressure is adapted to be supplied to and released from chamber 11 for controlling positioning of power piston 7, as will hereinafter be described in detail. At the opposite side of piston 7 there is provided another control chamber 14 containing a control spring 15 arranged to urge said piston in the direction of chamber 11 and to oppose its movement in the direction of chamber 14. The chamber 14 is connected by way of a passage 16 and pipe 17 to the operator's control valve device 2' through which it is normally vented to atmosphere, as disclosed in the aforementioned application.

In operation, when fluid under pressure is supplied to chamber 11 at a pressure sufficient to overcome the opposing action of spring 15, with chamber 14 open to atmosphere, the piston 7 moves against action of said spring to a position in which the force of the spring acting on one side of said piston equals the force of the pressure of fluid acting on the opposite side. Upon a partial release of fluid pressure from chamber 11, the forces are unbalanced in favor of the spring and the piston 7 and rod 8 move in the direction of said chamber to a position in which the equality of opposite forces acting thereon is again reestablished. Upon full release of fluid pressure in chamber 11, the spring 15 returns the piston 7 and attached rod 8 to the position shown in the drawing. The piston 7 may therefore be caused to assume any position to the left of the position in which it is shown in the drawing by providing the proper pressure of fluid in chamber 11, whether said fluid be steam, air, water, or etc.

With the piston 7 and attached rod 8 in the position in which they are shown in the drawing, the throttle control lever 4 is caused to assume its throttle cut-off or power off position in which it also is shown. In the opposite extreme position of piston 7 and rod 8, the throttle control lever 4 will assume its full throttle or maximum power position. Positioning of rod 8 intermediate its opposite extreme limits effects corresponding positioning of the throttle control lever 4. Therefore, the supply of steam to the delivery pipe 3 may be adjusted as desired by provision of proper pressure of fluid in chamber 11.

The pilot portion 6 comprises a flexible diaphragm 18 subject opposingly to pressure of a spring 19 in an atmospheric chamber 20 at one side and pressure of fluid in a control chamber 21 at its opposite side, the pressure of fluid in chamber 21 being adapted to be controlled by the operator's control device 2' through a control pipe 23 and a passage 22. A stem 24 is secured to the diaphragm 18 for movement therewith within a central bore 24' in the casing. A supply valve 25 is slidably disposed in a spring chamber 26 formed within a hollow portion of stem 24. A compression spring 27 is disposed in chamber 26 and arranged to urge the supply valve 25 to a normally seated position on a hollow seat member 28 attached to the end of stem 24 which end projects into chamber 13. The arrangement is such that as stem 24 is moved in the direction of chamber 13 the hollow seat member 28 attached thereto is moved away from the valve 25, which, as will hereinafter be pointed out, is prevented from such movement, thus allowing fluid under pressure from a supply chamber 29 to flow by way of registering ports, grooves and passages in the casing and in stem 24 and through the hollow seat member 28 into the chamber 13 hence to chamber 11 in the power cylinder 5' for positioning piston 7 and rod 8, the supply chamber 29 being connected by way of a pipe and passage 29' to the reservoir 3'.

A hollow release valve seat member 30 is slidably disposed within what might be called an extension of the bore 24' opening out through the casing. A release valve 31, having a fluted stem 32 which is slidably mounted in a central bore 33 at one end of the seat member 30, is disposed in the chamber 13. A compression spring 34 within member 30 is arranged to hold the release valve 31 in contact with a fluted stem 35 which is attached to the supply valve 25 and which projects through member 28 into chamber 13. An adjusting screw 36 is attached by means of screw-threads to the opposite end of member 30 which projects outside the casing.

The screw 36 is urged by spring 34, acting through the member 30, into contact with a lever 37 pin connected at its one end to a projecting casing member 38 and at its opposite end said lever is operatively connected to the piston rod 8 by means of a lug 37a projecting into an annular groove provided in said rod. The screw 36 initially is so adjusted that when the control chamber 21 is void of fluid under pressure and the diaphragm 18 and stem 24 are in the position in which they are shown in the drawing, due to the action of spring 19, the seat member 30 will be so disposed that the release valve 31 will be unseated, with the supply valve 25 closed, in which position they are shown in the drawing.

In operation, when fluid under pressure is supplied through passage 22 to increase pressure of fluid in the control chamber 21 in pilot portion 6, the increased pressure, acting on one side of diaphragm 18, overcomes the opposing force of control spring 19 and causes said diaphragm to deflect in the direction of chamber 20 to a position where the increase in compression of said spring will counterbalance the increased pressure of fluid in chamber 21. As the diaphragm 18 is thus moved, the stem 24 attached thereto will move in the direction of chamber 13, carrying the spring 27, supply valve 25, and release valve 31 with it until said release valve seats on member 30, whereupon continued movement of said stem will move same out of seating engagement with said supply valve, since the supply valve is held against further movement in this direction by its engagement with the now seated release valve 31 which, at this time, is held against movement by member 30, attached adjusting screw 36, the lever 37, and a relatively great reluctance to movement of the power piston 7 and rod 8.

Upon opening of the supply valve 25, fluid under pressure from the main reservoir 3', supplied through pipe 29' to chamber 29 containing said supply valve will flow past said valve to chamber 13 and thence via passage 12 to increase pressure of fluid in chamber 11 at the right hand face of power piston 7 to move said piston 7, attached rod 8, throttle control lever 4, and lever 37 in the direction of the left hand. After movement of diaphragm 18 ceases in a position corresponding to the pressure of fluid provided in chamber 21, as above described, the movement of the lever 37 by piston 7 will allow movement of the member 30 and the release valve 31 seated thereon, by pressure of fluid effective in chamber 13, outwardly with said lever, and this movement of release valve 31 will permit movement of the supply valve 25 by spring 27 toward its seat. The supply valve will finally engage its seat at a position of the power piston 7 corresponding to the position of said seat as predetermined by the pressure of controlling fluid provided in the control chamber 21 in the pilot portion. When the supply valve 25 thus closes, the flow of fluid under pressure to the chamber 11 will stop and hence movement of the power piston 7 will cease in a position corresponding to the pressure of fluid effective in chamber 21.

It will thus be seen that upon a certain deflection of diaphragm 18, as determined by the pressure of fluid in chamber 21, the power piston will adjust the throttle control lever 4 out of its steam cut-off position shown in Fig. 1 to supply steam to the delivery pipe 3 in an amount proportional to the pressure of fluid provided in chamber 21 in excess of an initial pressure necessary for effecting closure of the normally open release valve 31.

If the pressure of fluid in the control chamber 21 is reduced a desired degree, the spring 19 will then move the diaphragm 18 in the direction of said chamber to a new position corresponding to the reduced pressure. This movement of the diaphragm 18 will carry with it the supply valve 25 and attached stem 35, thus rendering the spring 34 effective to move the release valve 31 with the supply valve and relative to member 30 and out of seating engagement therewith. With the release valve 31 thus open, fluid under pressure will be released from chamber 13 and thus chamber 11 in power portion 5' through the bore 33 in seat member 30 and by way of a port 39 and an elongated annular groove 40 in said member, ports 41 and a release chamber 42 in the casing to a release passage 43, normally connected to atmosphere as will hereinafter be described in detail. Upon reduction in pressure of fluid in chamber 11, the spring 15 will move the piston 7, rod 8, lever 4, and lever 37 in the direction of the right hand. Movement of lever 37 will move the member 30 in the direction of the unseated release valve 31. After movement of the diaphragm 18 and release valve 31 ceases in a position corresponding to the reduced pressure of fluid in chamber 21, this movement of member 30 will be relative to said valve and will finally effect closure of said valve and prevent further reelase of fluid under pressure from the chamber 11. Movement of piston 7 will then stop in a position corresponding to the reduced pressure of fluid in control chamber 21. This movement of piston 7 will operate the throttle valve device 1 to correspondingly reduce the amount of steam supplied to the pipe 3, as will be apparent. Further release of fluid under pressure from chamber 21 will cause a further corresponding reduction in pressure of fluid in chamber 11 and the piston 7 will move to a corresponding position, in the same manner as just described. Upon reducing the pressure of fluid in chamber 21 to substantially atmospheric pressure, the release valve 31 returns to its normally unseated position in which it is shown in the drawing.

It will now be seen that any desired amount of steam normally may be supplied to the pipe 3 by providing fluid at the proper selected pressure in chamber 21, while a reduction in pressure of fluid in said chamber to substantially atmospheric pressure will effect the cutting off of the supply of steam to the delivery pipe 3.

As was a feature of the fluid pressure motor referred to in the aforementioned application, the motor 1' embodies an insuring valve device comprising a poppet valve 45 contained in a chamber 46 which is open to chamber 13 by way of a passage 47. The valve 45 has a fluted stem extending through a bore into a chamber 48 which is open to a release chamber 42 via a passage 49, said valve being thus arranged to control communication between chamber 13 and release chamber 42, as does the release valve 31, but under different operating conditions, as will hereinafter be brought out. A spring 50 in chamber 46 acts on valve 45 for urging it toward a seated position. The projecting end of the fluted stem attached to valve 45 engages in chamber 48 the projecting end of a stem 51 which extends through an opening in a wall separating said chamber 48 from an atmospheric chamber 52 provided at one side of a piston 53 to which stem 51 is connected. Chamber 52 is open to atmosphere via a port 54. At the opposite side of piston 53 there is a pressure chamber 55 which is connected to a branch of the passage 16 normally open to atmosphere.

The operator's control valve device 2' comprises a handle 56 operatively connected to self-lapping valve means (not shown) disposed in the portion of the casing shown in outline. The handle 56 is movable within a normal operating range to positions between a throttle cut-off position and a full throttle position corresponding to similar positions of the rod 8 and throttle control lever 4 of motor 1' and throttle valve device 1. A pipe 57 connects device 2' with the reservoir 3', and in moving handle 56 from throttle cut-off position toward and including full throttle position the self-lapping valve means (not shown) connected thereto is rendered effective to supply fluid under pressure from pipe 57 to pipe 23 and thereby increase pressure of fluid in the control chamber 21 of motor 1' from a certain minimum pressure, corresponding to throttle cut-off position, to a pressure in accordance with the degree of movement thereof in the direction of full throttle position, which latter position corresponds to a certain maximum pressure. By movement of handle 56 in the opposite direction, toward or to the throttle cut-off position, a release of fluid under pressure is effected from chamber 21 by way of pipe 23 to thereby adjust the pressure of fluid in said chamber to a value in accordance with the new position of the handle.

The operator's control device further comprises valve means (not shown) operative by the handle 56, in all positions of said handle within the normal range between throttle cut-off and full throttle positions, to maintain the pipe 17, hence chambers 14 and 55 via passage 16 in motor 1', open to atmosphere. To insure return of piston 7 and rod 8 to throttle cut-off position, in case of breakage of spring 15, the handle 56 may be moved beyond throttle cut-off position to a return insuring position to supply fluid under pressure from pipe 57 to pipe 17, and thence to chambers 14 and 55 in fluid pressure motor 1'. Increase in pressure of fluid in chamber 14 will act on piston 7 to urge said piston in the direction of chamber 11, while increase in pressure of fluid in chamber 55 will act on piston 53 to move said piston in the direction of atmospheric chamber 52 to effect unseating of poppet valve 45 and thereby venting of fluid under pressure from chamber 11 by way of passage 12, chamber 13, passage 47, chamber 46, the unseated valve 45, chamber 48, and passage 49 to the release chamber 42. Release of fluid under pressure in chamber 11 is thus assured even though the release valve 31 should fail to unseat for any reason, and supply of fluid under pressure to chamber 14 insures return of piston 7 to its normal rest position in which position it is shown in the drawing.

In accordance with a feature of the invention the release passage 43 in motor 1' is connected to a pipe 80 which is in turn connected to the emergency valve device 4' which normally connects said pipe 80 to atmosphere, whereby release of fluid under pressure from chamber 11 in the motor 1', either by way of the release valve 31 or poppet valve 45, as above described, will occur through said device.

The emergency valve device 4' is preferably mounted at the operator's station, such as in the cab of a steam locomotive, adjacent to the control valve device 2'. The device 4' comprises a hollow casing 81 having two axially aligned cylindrical chambers 82 and 83 formed therein by a counterbore 84 at opposite sides of a cylindrical seat member 85 which has a press fit with the wall of said bore. A removable cover member 86 closes the lower end of the chamber 83 which chamber is constantly open to the atmosphere by way of an exhaust pipe 87 connected thereto. The chamber 82 is constantly open by way of a choke 88 to an emergency supply pipe 89 which may be connected to the pipe 2 for supplying fluid under pressure, such as steam, to said chamber from a source thereof which is independent of reservoir 3'. The seat member 85 is provided with a central bore 90 extending longitudinally therethrough and opening at its opposite ends into chambers 82 and 83, respectively. Intermediate its ends the bore 90 is connected to a radial casing port 91 which is connected to the release pipe 80. A normally closed supply valve 92, preferably in the shape of a frustrated cone, is disposed in chamber 82 and is adapted to cooperate with seat member 85 to control communication between the chamber 82 and the bore 90 as well as to control the rate of flow of fluid under pressure thereto, as will be described. A normally open release valve 93, also in the shape of a frustrated cone, is disposed in chamber 83 and is arranged to cooperate with the member 85 for controlling communication between the bore 90 and said chamber, as well as for controlling the rate of flow of fluid under pressure therethrough. The valves 92 and 93 are oppositely arranged and rigidly connected one with the other by means of a rod 94, so that both may move simultaneously. A valve stem 95 is secured to actuate the valves 92 and 93. The stem 95 extends through chamber 82 and projects out through an opening in the casing. A packing nut 96 encircles stem 95 and is adjustably secured by means of screw-threads to the casing 81 in such a manner as to effect compression of an annular packing gland 97 into sealing engagement with the stem 95 for preventing leakage of fluid under pressure from chamber 82 past said stem. A portion of stem 95 is in screw-threaded engagement with the nut 96, so that by turning a handle 98 attached to its outer projecting end, the stem 95 may be extended and retracted into and out of the casing for actuating valves 92 and 93.

A safety valve 99 is interposed in the release pipe 80 to serve the usual purpose of relieving any excess pressure which might build up in said pipe, to thereby prevent damage to the motor 1'.

Cut-out cocks 100 and 101 are interposed in pipes 57 and 29', respectively. Normally the cocks 100 and 101 are open to permit control of the fluid pressure motor 1' by fluid under pressure supplied from reservoir 3' by operation of the operator's control device 2'. In the event of failure of pressure of fluid within the system, either or both, depending upon the nature of such failure, of the cut-out cocks 100 and 101 may be moved to a closed position to isolate reservoir 3' from the control system.

Now assume that the handle 56 of the operator's control valve device 2' is positioned within its normal operating range and is maintaining a certain pressure of fluid in control chamber 21 of pilot portion 6 in fluid pressure motor 1' which in turn in response thereto is holding a certain pressure within chamber 11 in power portion 5' so that the rod 8 will be in an extended position in accordance with position of said handle of device 2'.

Now if the pressure of fluid supplied to the device 2' and/or to the fluid pressure motor 1' from reservoir 3' should fail accidentally, due to failure of supply of fluid under pressure to said reservoir, breakage of control or supply pipes or the like; it will be appreciated that the motor 1' will thereby be rendered non-controllable by the operator's control valve device 2', and the parts of the fluid pressure motor 1' upon leakage of fluid under pressure therefrom will return to the position in which they are shown in the drawing. It will be recalled that, in absence of fluid under pressure in chamber 21 of motor 1', the supply valve 25 is seated and the release valve 31 is unseated, thus opening the chamber 13 and connected chamber 11 in power portion 5' to the release chamber 42 and pipe 80 by way of bore 33, ports 39 and 41, and passage 43. With chamber 11 thus vented, the throttle control lever 4 will assume throttle cut-off position and supply of steam from pipe 2 to the locomotive driving means via pipe 3 would be cut off so that the locomotive would not operate.

Under such an emergency situation, to effect operation of the locomotive, the operator or engineer, as the case may be, will turn the handle 98 of the emergency control valve device 4' in such a direction as will effect unseating of the supply valve 92 therein, allowing steam, or fluid under pressure from a source, independent of the reservoir 3', to flow from the pipe 89 connected to pipe 2 by way of choke 88, chamber 82, bore 90, and passage 91 into the release pipe 80. The steam or other fluid thus supplied to the pipe 80 will flow into the release passage 43, and, by way of the unseated release valve 31 and open communication previously defined, will flow into the chamber 11 in the power portion 5'. The pressure of the steam thus supplied to chamber 11 under emergency conditions will act to operate the power piston 7 and rod 8 and thereby lever 4 in the same manner as was previously described in regard to normal operation thereof by air. In this manner, the locomotive steam throttle valve device 1 may be operated to bring the locomotive controlled thereby into service.

In the emergency control valve device 4', when the valve 92 is initially opened, the release valve 93 attached thereto is also open, so that steam supplied to the bore 90 will flow through chamber 83 to the atmosphere by way of the exhaust pipe 87, as well as into the release pipe 80 for operating the motor 1'. By adjustment of the shaft 95, effected by turning handle 98, the valve 92 may be positioned closer to or further away from the seat member 85 while the attached valve 93 is thus positioned conversely. The effect of moving either of the conical shaped valves away from seat member 85 is to increase the flow area past the respective unseated valve, and the effect of moving either of said valves toward said seat member is just the opposite, that is, to decrease the flow area past the valve. The flow area past valve 92 determines the rate of flow of steam from chamber 82 into bore 90, and the flow area past valve 93 determines the rate of flow of said steam to the atmosphere. By proper adjustment of these flow areas, as effected by simultaneous movement of the two valves, the pressure of steam obtained in pipe 89 and thence chamber 11 in motor 1' may be controlled. The choke 88 acts to restrict the supply of steam into the chamber 82 to prevent an excessive loss of steam to atmosphere upon initially unseating valve 92. It will be seen that pressure of steam supplied to chamber 11 in motor 1' will be at a maximum when, simultaneously, the supply valve 92 is fully open and the release valve 93 is seated, and that conversely the pressure of steam in said chamber 11 will be substantially atmospheric when supply valve 92 is seated and the release valve 93 fully open. It will further be seen then that the motor 1' may be operated and positioned by steam supplied to chamber 11, and that the pressure of said steam may be controlled with sufficient accuracy by the emergency valve device 4' to insure positioning of the locomotive throttle valve device 1 and thereby control of the locomotive.

*Summary*

From the above description it will be seen that in case of failure of the normal supply of fluid under pressure for controlling the throttle on the locomotive, the throttle may still be controlled by fluid under pressure from an independent source thereof, such as the steam on a steam locomotive, by operation of the operator's emergency valve device so that the locomotive may still be operated so as to, for instance, be brought in for repair.

Having now described my invention, what I claim as new and desire to secure by Letters Patent, is:

1. In combination, two independent sources of fluid under pressure, a fluid pressure adjustable motor, pilot means operable by fluid under pressure from one of said sources for supplying fluid under pressure from said one source to said motor and upon release of fluid under pressure to establish a fluid pressure release communication from said motor, an operator's control device for controlling supply of fluid under pressure from said one source to said pilot means and for releasing fluid under pressure therefrom, another operator's control device for selectively opening said communication to atmosphere or to the other source of fluid under pressure, and valve means for opening and closing communication between said one source and the first named operator's control device and said pilot means.

2. In combination, two independent sources of fluid under pressure, a fluid motor comprising a fluid pressure adjustable piston subject on one side to pressure of fluid in a first chamber and on the opposite side to pressure of fluid in a second chamber, pilot means operable by fluid under pressure from one of said sources to supply fluid under pressure from said one source to said first chamber and operable upon release of fluid under pressure to open said first chamber to a fluid pressure release pipe, release ensuring means operable by fluid under pressure to connect said first chamber to said release pipe and upon release of fluid under pressure to close such connection, an operator's control device for supplying fluid under pressure from said one source to operate said pilot means and for simultaneously releasing fluid under pressure from said second chamber and from said ensuring means, and for also releasing fluid under pressure from said pilot means and simultaneously supplying fluid under pressure from said one source to said second chamber and said ensuring means, and another operator's control device for selectively opening said release pipe to atmosphere or to the other source of fluid under pressure.

3. In a control apparatus, the combination with a first fluid pressure source and a second fluid pressure source, of piston means adjustable in accordance with the degree of pressure of fluid in a chamber, fluid pressure operated valve means comprising a normally closed supply valve for controlling supply of fluid under pressure from said first fluid pressure source to said chamber and a normally open release valve for controlling release of fluid under pressure from said chamber to a fluid pressure release conduit, an operator's control valve device for controlling operation of said valve means, and an emergency valve device operable to effect supply of fluid under pressure from said second fluid pressure source to said release conduit.

4. In a control apparatus, the combination with a first fluid pressure source and a second fluid pressure source, of piston means adjustable in accordance with the degree of pressure of fluid in a chamber, fluid pressure operated valve means comprising a normally closed supply valve for controlling supply of fluid under pressure from said first fluid pressure source to said chamber and a normally open release valve for controlling release of fluid under pressure from said chamber to a fluid pressure release conduit, an operator's control valve device for controlling operation of said valve means, an emergency valve device operable to effect supply of fluid under pressure from said second fluid pressure source to said release conduit, said emergency valve device comprising a casing having a fluid pressure supply chamber formed therein open to said second fluid pressure source and a fluid pressure exhaust chamber open to atmosphere, a valve seat member fixed within said casing and having an opening extending therethrough between said supply chamber and said exhaust chamber, said opening being connected to said release conduit, a normally closed conical shaped supply valve disposed in said supply chamber and adapted to cooperate with said seat member for controlling communication between said supply chamber and said opening, a normally open conical shaped release valve disposed in said exhaust chamber and adapted to cooperate with said seat member for controlling communication between said opening and said exhaust chamber, a rigid member securing one valve with the other, and a manually adjustable stem secured to the valves for simultaneously adjusting their positions relative to the seat member.

5. In combination, a source of compressed air, a source of steam, a fluid pressure adjustable motor, one operator's control device for selectively supplying compressed air from the first named source to said motor and for opening said motor to a fluid pressure release pipe, a second operator's control device comprising a pair of oppositely arranged and simultaneously movable conical shaped valves one for regulating flow of steam from said steam source to said release pipe and the other for controlling communication between said pipe and an exhaust pipe, means for moving said valves, and choke means for restricting flow of steam from said steam source to said one valve.

6. In combination, two independent sources of fluid under pressure, a fluid pressure adjustable motor, pilot means operable by fluid under pressure from one of said sources for supplying fluid under pressure from said one source to said motor and upon release of fluid under pressure to establish a fluid pressure release communication from said motor, an operator's control device for controlling supply of fluid under pressure from said one source to said pilot means and for releasing fluid under pressure therefrom, and another operator's control device for selectively opening said communication to atmosphere or to the other source of fluid under pressure.

ARTHUR J. BENT.

REFERENCES CITED

The following references are of record in the file of this patent:

UNITED STATES PATENTS

| Number | Name | Date |
|---|---|---|
| 498,507 | Clark | May 30, 1893 |
| 528,275 | Martin | Oct. 30, 1894 |
| 585,377 | Craig | June 29, 1897 |
| 653,187 | Smith | July 3, 1900 |
| 1,338,379 | Leach | Apr. 27, 1920 |
| 1,839,393 | Inge | Jan. 5, 1932 |
| 2,110,702 | Farmer | Mar. 8, 1938 |
| 2,418,129 | Larson | Apr. 1, 1947 |